United States Patent [19]

Woody et al.

[11] Patent Number: 5,591,937
[45] Date of Patent: Jan. 7, 1997

[54] HIGH POWER, HIGH FREQUENCY TRANSMISSION CABLE BREACH DETECTION

[75] Inventors: George R. Woody, Redondo Beach; Stephen J. Hulsey, Los Angeles, both of Calif.

[73] Assignee: Hughes Aircraft Company, Los Angeles, Calif.

[21] Appl. No.: 348,664

[22] Filed: Dec. 2, 1994

[51] Int. Cl.$^6$ .................. H02G 3/03; H01B 7/34
[52] U.S. Cl. .......... 174/5 R; 174/15.1; 174/14 R; 174/15.6; 174/28
[58] Field of Search .................. 174/24, 14 R, 174/50.6, 15.1, 8, 5 R, 15.6, 28

[56] References Cited

U.S. PATENT DOCUMENTS

| | | | |
|---|---|---|---|
| 3,955,042 | 5/1976 | Kellow et al. | 174/15 C |
| 3,962,529 | 6/1976 | Kubo | 174/15 C |
| 4,117,525 | 7/1978 | Moore | 361/37 |
| 4,607,133 | 8/1986 | Alloin et al. | 174/15 WF |
| 5,090,211 | 2/1992 | Peters | 62/149 |
| 5,137,054 | 8/1992 | Harper | 137/614 |
| 5,442,131 | 8/1995 | Borgwarth | 174/15.6 |

FOREIGN PATENT DOCUMENTS

| | | | |
|---|---|---|---|
| 2549241 | 5/1977 | Germany | 174/15.6 |
| 669413 | 6/1979 | U.S.S.R. | 174/15.6 |

*Primary Examiner*—Kristine L. Kincaid
*Assistant Examiner*—Marc Diamant Machtinger
*Attorney, Agent, or Firm*—Leonard A. Alkov; Mark A. Navarre

[57] ABSTRACT

A transmission cable system that incorporates cooling channels that encircles electrical conductors with coolant. The transmission cable system also provides for breach or leak detection. More specifically, the transmission cable system maybe used with an inductive charging system that transfers electric power from a power source to batteries of an electric vehicle. The cable system includes a cooling system for storing, cooling, and pumping coolant, and a pressure sensitive switch for determining the pressure in the cooling system and for providing an output signal indicative of a drop in sensed pressure. A controller is coupled to the pressure sensitive switch that is responsive to the output signal from the switch for shutting down the inductive charging system in the event of a drop in sensed pressure. The transmission cable is electrically coupled between the power source and the electric vehicle for coupling electrical power to the batteries. The transmission cable is also coupled between the cooling system and the inductive charging system and includes a plurality of coolant channels that permit the flow of coolant between the cooling system and the inductive charging system that cools the transmission cable when transferring electrical power.

1 Claim, 1 Drawing Sheet

HIGH POWER, HIGH FREQUENCY TRANSMISSION CABLE BREACH DETECTION

BACKGROUND

The present invention relates to power transmission cables, and more particularly, to a transmission cable system and breach detection scheme for use with transmission cables.

Previous schemes for determining breach detection in cables was to cut through internal wires or optic fibers which broke a signal causing the unit coupled to the cable to shut down. Also, special outer shields have been used that have double layers that make contact when squeezed by a shearing or cutting apparatus.

However, when cutting the internal wire or optic fiber, there is a danger in completely cutting through the conductors without cutting thru the breach detection wires first, which causes a safety hazard. The method using the double outer shield is difficult to make since the two shield layers have to be separated by dielectric material. Furthermore, when the cable is cut, there is no guarantee that the two layers make contact with the dielectric that separates them. This problem is solved by using perforated dielectric. However, this type of cable is not only difficult to produce, but can also accidently cause the system to shut down if the cable is bent at too sharp a radius.

Therefore, it is an objective of the present invention to provide for a transmission cable system and breach detection scheme for use with transmission cables.

SUMMARY OF THE INVENTION

In order to meet the above and other objectives, the present invention is a transmission cable system that incorporates a cooling channel that completely encircles the transmission cable with coolant. The present transmission cable system provides for breach detection at a lower cost than conventional schemes and is more dependable.

More specifically, the present invention is a transmission cable system 10 for use with an inductive charging system 11 that transfers electric power from a power source 12 to batteries 14 of an electric vehicle 15. The cable system 10 comprises a cooling system 20 for storing, cooling, and pumping coolant 23, and a pressure sensitive switch 26 for determining the pressure in the cooling system 20 and for providing an output signal indicative of a drop in sensed pressure. A controller 27 is coupled to the pressure sensitive switch 26 that is responsive to the output signal from the switch 26 for shutting down the inductive charging system 11 in the event of a drop in sensed pressure.

A transmission cable 30 is electrically coupled between the power source 12 and the electric vehicle 15 for coupling electrical power to the batteries 14. The transmission cable 30 is also coupled between the cooling system 20 and the inductive charging system 11 and comprises a plurality of coolant channels 31, 32 that permit the flow of coolant 23 between the cooling system 20 and the inductive charging system 11 that cools the transmission cable 30 when transferring electrical power.

The transmission cable is a medium by which electric power is transferred from the power source to a port used for charging the electric vehicle. The design of the cable is such that its overall size is greatly reduced to maximize cable manageability. Using the novel direct contact cooling approach of the present invention, touch temperatures are maintained even at extremely high power charging, on the order of 25–150 kW. The present invention uses liquid coolant. The coolant is disposed in a cooling channel disposed between an outer conductor of the cable and an outer jacket and shield of the cable. Because of this, breach detection is achieved using a pressure switch sensitive to reduced pressure of the coolant and which is activated if the cable is cut. The switch may be integrated into the charging system to shut down the system if the charge cable is cut or if the cable has sprung a leak.

There is a desire to develop inductive charging apparatus that provides for inductive coupling at very high charge rates. The present cable system makes such high charge rate inductive coupling practical and safer for a user, because of the built-in safety feature.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
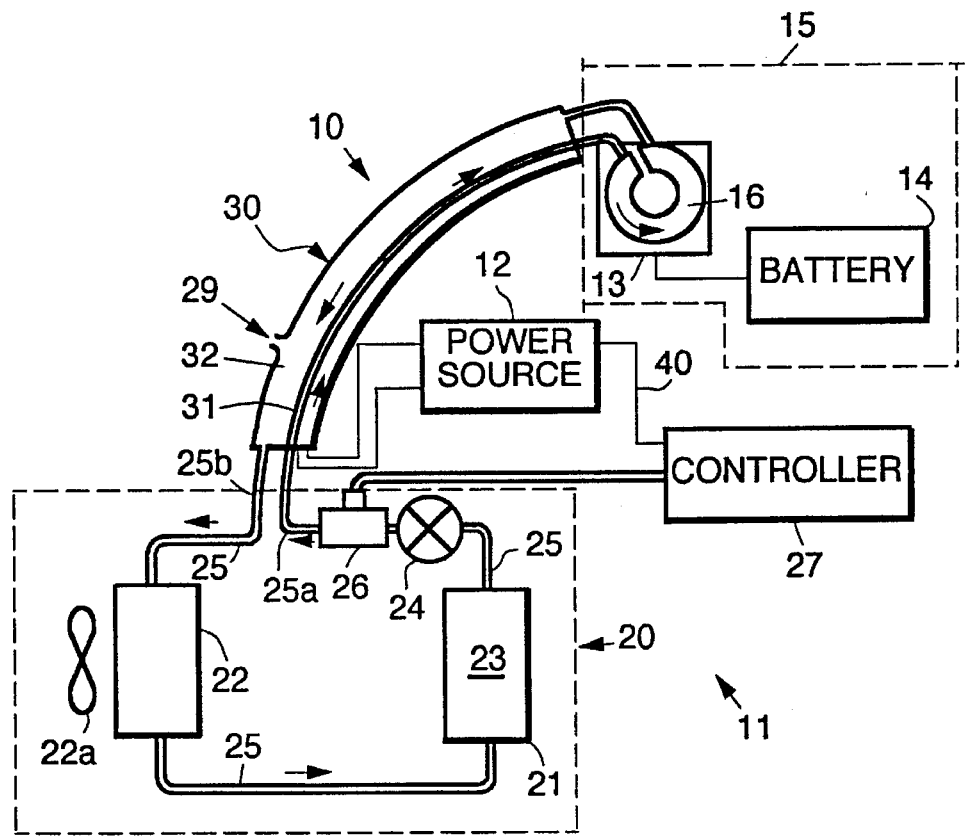
FIG. 1 illustrates a transmission cable system in accordance with the principles of the present invention.

Referring to the drawing figure, FIG. 1 illustrates a transmission cable system 10 in accordance with the principles of the present invention. The transmission cable system 10 is shown as part of an electric vehicle inductive charging system 11. The transmission cable is a medium by which electric power is transferred from a power inverter 12 or power source 12 to a port 13 used for charging propulsion batteries 14 of an electric vehicle 15. The port 13 is part of an inductive coupler 16 that couples power to propulsion batteries 14 of the electric vehicle 15.

The transmission cable system 10 comprises a cooling system 20 comprising a reservoir 21 for storing coolant 23, a refrigerator 22 or radiator-type cooler 22 including a fan 22a for cooling the coolant 23, a pump 24 for pumping the coolant 23, a plurality of coolant lines 25 interconnecting the reservoir 21, cooler 22 and pump 24, and a pressure sensitive switch 26 for determining the pressure in the coolant lines 25. A transmission cable 30 in accordance with the present invention is coupled between the cooling system 20 and the port 13 of the inductive charging system 11, and to the power inverter 12 or power source 12 for coupling electrical power to the port 13. The transmission cable 30 is designed to conduct coolant 23 therethrough as well as conduct electrical power for charging the propulsion batteries 14 of the electric vehicle 15. The pressure sensitive switch 26 is coupled to a controller 27 and provides an output signal to the controller 27 to shut down the inductive charging system 11 in the event of a drop in the pressure in the transmission cable 30.

Figure 2:
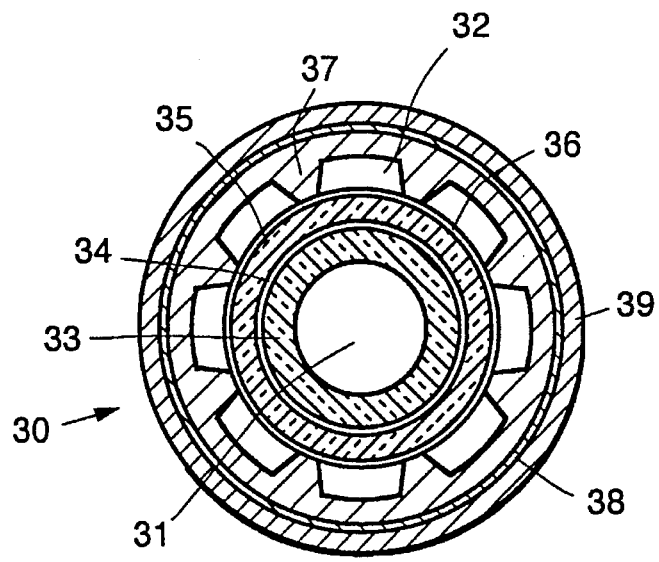
FIG. 2 is a cross sectional view of the transmission cable employed in the transmission cable system of FIG. 1.

FIG. 2 is a cross sectional view of the transmission cable 30 employed in the transmission cable system 10 of FIG. 1. Referring to FIG. 2, coolant channels 31, 32 are provided through the transmission cable 30 the permit the flow of coolant 23 between the cooling system 20 and the port 13 of the inductive charging system 11. The transmission cable 30 is comprised of an inner coolant channel 31, which is surrounded by a first concentric dielectric layer 33. The first concentric dielectric layer 33 is surrounded by a first concentric conductor 34. The first concentric conductor is surrounded by a second concentric dielectric layer 35. An outer conductor 36 is concentrically disposed around the second concentric dielectric layer 35. A plurality of outer coolant channels 32 surround the outer conductor 36, and are formed in a grooved dielectric layer 37. An outer shield 38 is concentrically disposed around the grooved dielectric layer 37 and plurality of outer coolant channels 32. An outer dielectric jacket 39 encloses the outer shield 38.

Referring again to FIG. 1, one of the coolant lines 25 comprises an input coolant line 25a that is connected to the inner coolant channel 31, for example, and a return coolant line 25b is connected to the outer coolant channel 32, for example. Thus, coolant 23 may be pumped from the cooling system 20 through the inner coolant channel 31 to the port 13 and back to the cooling system 20 through the outer coolant channel 32. The cooling system 20 and cooling channels 31, 32 provide a means to cool the transmission cable 30 when transferring electrical power at high transfer rates. Furthermore, the existence of a breach or leak is detected by means of the pressure sensitive switch 26 which detects a drop in the pressure in the coolant channels 31, 32 if a breach or leak 29 occurs.

The transmission cable 30 is comprised of concentric tubing. The center coolant channel 31 carries coolant 23 in one direction and the outer concentric coolant channels 32 carries the coolant 23 in the opposite direction. The coolant 23 in the outer channels 32 comprises a high dielectric strength coolant 23. A coolant 23 for use in the transmission cable 30 is synthetic oil, for example.

The coolant 23 helps to maintain the outer touch temperature of the transmission cable 30 at an acceptable level, typically on the order of 5 degrees Celsius. The outer coolant channels 32 also completely surrounds the outer conductor 36 of the transmission cable 30. The outer coolant channels 32 are disposed between the outer shield 38 and the outer conductor 36 of the cable 30 giving a user an extra measure of protection.

If the outer jacket 39 of the cable 30 is cut to expose the outer coolant channels 32, the pressure sensitive switch 26 at the discharge end of the cooling pump 24 detects the reduced pressure. The pressure sensitive switch 26 is either opened or closed (depending on the circuit design) and provides an output signal to a controller 27 to shut down the charging system 11 via line 40. Shutting down the inductive charging system 11 also provides for indirect overtemperature detection since the coolant 23 will not flow in the coolant channels 31, 32 at the designed rate if the leak 29 occurs in the cable 30.

Thus, them has been disclosed a new and improved transmission cable system and breach detection scheme for use with transmission cables. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An electric vehicle inductive battery charging system that transfers electric power from a power source to batteries of the electric vehicle, said inductive charging system comprising:

a cooling system for storing, cooling, and pumping coolant;

a pressure sensitive switch for determining the pressure in the cooling system and for providing an output signal indicative of a drop in sensed pressure;

a controller coupled to the pressure sensitive switch responsive to the output signal from the switch for shutting down the inductive charging system in the event of such drop in sensed pressure; and a transmission cable for electrically coupling the power source to the batteries via an inductive charge port on the vehicle, and for coupling coolant between the cooling system and the inductive charge port via a plurality of coolant channels in the cable.

\* \* \* \* \*